United States Patent [19]
Werner

[11] 4,139,321
[45] Feb. 13, 1979

[54] ROCK CHANNEL HEAT STORAGE

[76] Inventor: Frank D. Werner, Box SR9, Jackson, Wyo. 83001

[21] Appl. No.: 764,511

[22] Filed: Jan. 31, 1977

Related U.S. Application Data

[62] Division of Ser. No. 579,492, May 21, 1975, Pat. No. 4,024,910.

[51] Int. Cl.² ............................................. F16L 1/00
[52] U.S. Cl. .................................. 405/154; 405/131; 126/270; 165/45; 237/1 R
[58] Field of Search .................... 61/105, 50, 36 A; 165/45; 126/270 E, 271, 400; 237/1

[56] References Cited

U.S. PATENT DOCUMENTS

| | | | |
|---|---|---|---|
| 2,828,681 | 4/1958 | Smith | 62/2 X |
| 3,987,786 | 10/1976 | Keyes et al. | 126/270 X |
| 4,054,246 | 10/1977 | Johnson | 237/1 A |

*Primary Examiner*—Jacob Shapiro
*Attorney, Agent, or Firm*—Nickolas E. Westman

[57] ABSTRACT

A heat or cold storage system utilizing a plurality of channels dug directly into the earth and filled with rocks which are used to absorb heat or cold for storage, a part of such storage being the rocks themselves and a (usually much larger) part being the adjacent earth. Conduit connections are provided for carrying heat or cold to the rocks.

5 Claims, 4 Drawing Figures

ROCK CHANNEL HEAT STORAGE

This is a division, of application Ser. No. 579,492, filed May 21, 1975 now U.S. Pat. No. 4,024,910.

BACKGROUND OF THE INVENTION

1. Field of the Invention

The present invention relates to the storage of heat or cold in substantial quantities over relatively long periods of time.

2. Prior Art

With the recent emphasis on use of solar heat, in particular, the problems associated with storing such heat for use at a later time have become more apparent. The high cost of construction of storage devices has minimized the effectiveness and utility of solar heat. Likewise, storage of heat from any source as well as the storage of "cold" or negative heat has been a problem. In general, large volumes of storage media are absolutely essential, and at the present time the costs of providing storage devices of adequate size has proved to be a limiting factor.

In the prior art, the use of solid heat or cold storage media has been known. Likewise, in-ground storage, where the ground itself has been used for heat or cold storage is shown in U.S. Pat. No. 3,262,493, where ducts are buried directly into the ground. The undisturbed earth around the ducts is used for heat or cold storage. Thus, high cost duct work is provided in the ground, which is expensive to install and also to maintain. A liquid is used for heat exchange, raising the costs of construction even further.

The use of rock as a storage medium is shown in U.S. Pat. No. 2,680,565. A separate chamber inside a room or bin within the home being heated is used for the rock.

Other devices utilizing solid material heat storage media are shown in U.S. Pat. No. 3,369,541 and 3,412,728. These patents are believed to be typical of many others which use stones or sand within chambers or bins for heat storage.

In some cases, one is concerned that internal circulation should not happen, such as a case where rocks in one end of a channel are hot and are cold in the other end. This is known and a preventative measure is known, of circulating the air vertically, as described in Solar Energy Thermal Processes by Duffie, J. A., & Backman, W. A., John Wiley & Sons, Inc., 1974, p. 227–228.

SUMMARY OF THE INVENTION

The present invention relates to the provision of channels dug directly in the ground with existing excavating equipment and which are filled with rock to provide a heat or cold storage medium in large quantities that will permit the heating or cooling of occupied structures in times of need. Adequate volume of storage material can be provided without exorbitant costs and without providing above ground storage facilities.

In its simplest form a trencher used commonly for forming drain fields, septic systems, and also for shallow sewer work or a commonly available "back hoe" digger is used to dig a number of channels in desired locations in the ground adjacent to the structure to be heated or cooled. The channels are then filled with rock or rock-like material of suitable size and suitable connecting ducts are placed in position as desired. Additional channels may also be quicky dug if desired. These connecting ducts are then piped to the source of heat or cold, and to the heating or cooling system of the structure to be heated or cooled. The ducts can be used in any desired manner for heat distribution or cold distribution.

In areas where the water table is not a substantial factor, the rock filled channels can be used as they are formed without any additional insulation or other expensive additions, except for being covered over after they have been filled. Heated or cooled air is circulated to the rocks for heat exchange. The sources of heated or cooled air may be solar heat collectors, or ambient air heat or cold collectors, or heat from industrial power plants or other locations where an excess of heat is provided at times.

Because large amounts of earth are in thermal contact with the rock-filled channels, earth participates in the heat storage. In the case of long duration heating or cooling (a number of hours or days or longer), heat storage of the adjacent earth may equal or even greatly exceed the amount of heat stored in the rocks themselves.

Two forms of the invention are shown, providing different heat flow patterns. Various configurations of course can be formed without departing from the scope of the invention. The ability to provide the low cost channels easily constructed with existing excavating equipment, and using the earth which is already present together with low cost rock fill increases the economic feasibility of utilizing low cost energy sources for heating or cooling.

In the case of a high water table, very difficult digging or other problem, the heat storage structure may be built above or partly above the original grade line so as to form a small hill.

DESCRIPTION OF THE PREFERRED EMBODIMENTS

Figure 1:
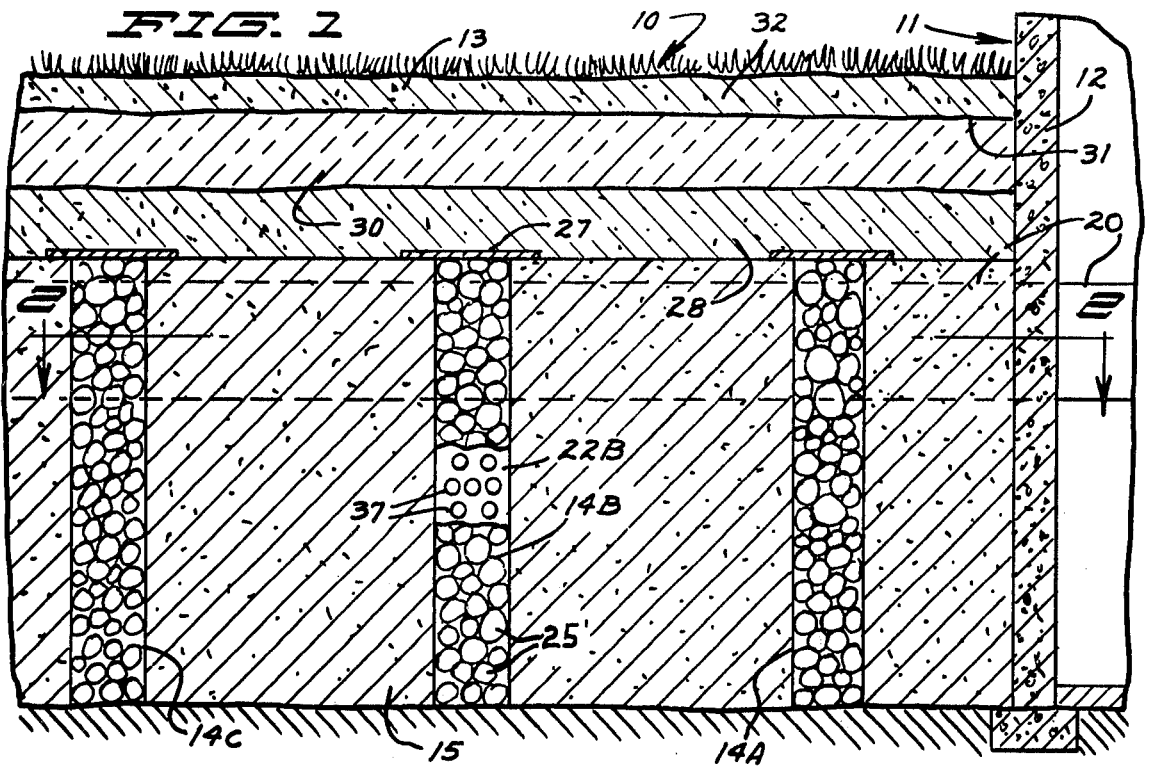
FIG. 1 is a part schematic vertical sectional view through a section of earth showing the storage system made according to the present invention installed adjacent to a building and taken as on line 1—1 in FIG. 2.

Referring first to FIG. 1, a heat storage area or bed indicated generally at 10 is positioned adjacent the building 11. The building is shown merely for sake of convenience, and the storage area 10 may be spaced a substantial distance from the building if desired. The building wall 12 is shown below the grade line 13 of the ground.

In the construction of the heat storage system, (heat is used in its broad sense to include negative heat or cold) a plurality of channels as indicated at 14A, 14B, and 14C are excavated into the ground in desired locations, to desired depths and at desired widths. Excavation equipment used for ditching can dig down to a depth of twelve feet below the surface of the ground without any problem. A typical width may be in the range of one foot, and the length can be practically any desired length. The channels can be squared off fairly well adjacent their side edges, and the bottoms can be formed substantially planar without substantially disturbing the earth indicated generally at 15 between the channels. One such channel has been made and used with horizontal airflow to store cold in winter for many months, with results generally as described herein.

Figure 2:
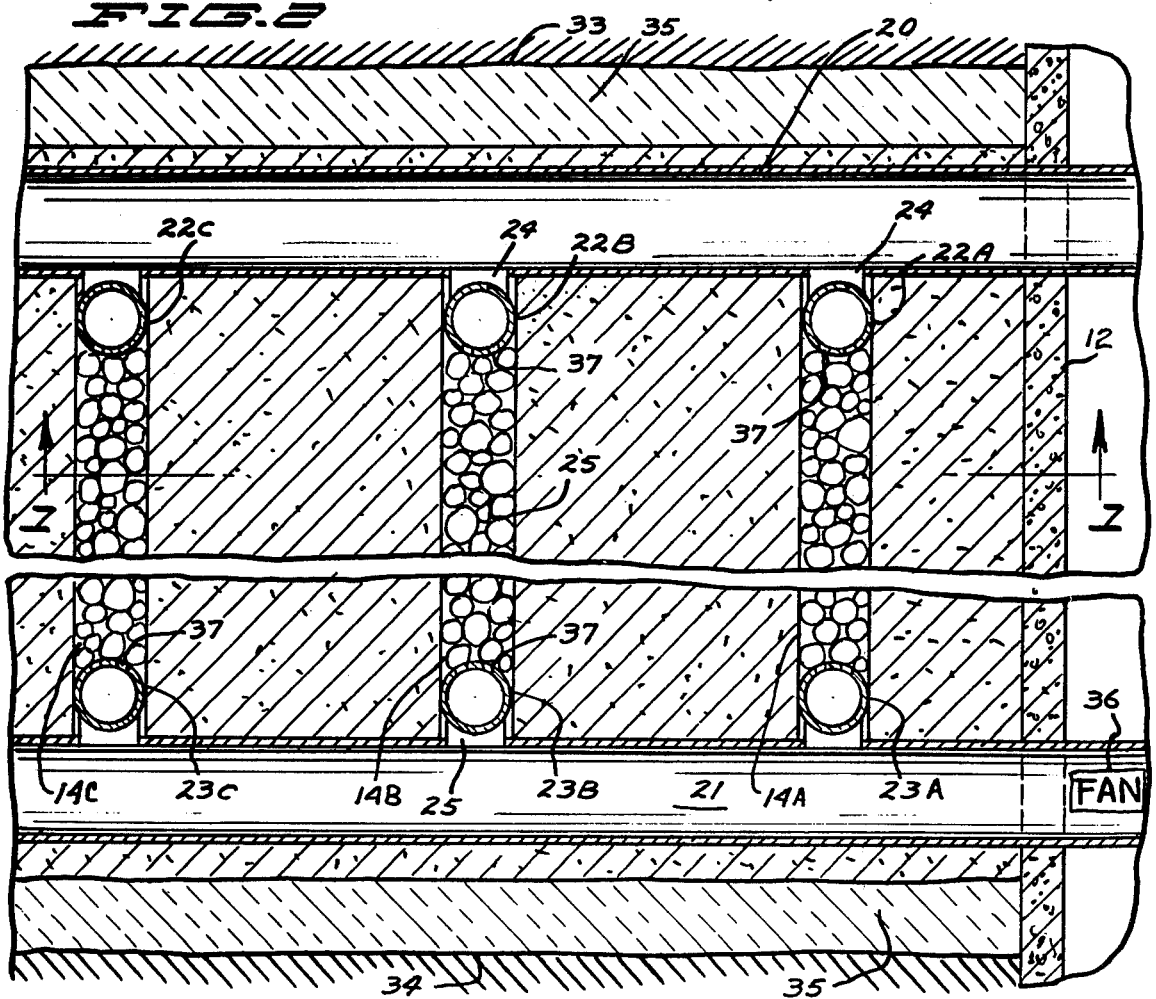
FIG. 2 is a sectional view taken as on line 2—2 in FIG. 1.

If desired, the entire overlying area of the storage area 10 can be excavated to a suitable depth before the channels are started to provide a space for insulation of the channels if desired or the channels can be started at the surface of the ground. Further, excavations at right angles to the channels can be made adjacent the ends of the channels 14A, 14B and 14C for the installation of main supply and return ducts or pipes indicated generally at 20 and 21, in FIG. 2, which is a plan sectional view of the storage area. The ducts or pipes can then be installed in the side channels in a known manner and extended into the building 11 if desired. Further, as shown in FIG. 2 vertical distributor ducts or conduits indicated at 22A, 22B and 22C are installed adjacent one end of the respective channels 14A-14C, and vertical distributor ducts or conduits 23A, 23B and 23C are installed at the opposite ends of the channels 14A-14C. The distributor ducts extend for the vertical depth of the channels and are contiguous to the rocks filling the channels 14A-14C. The distributor ducts 22A-22C are connected through short duct connector sections 24 to the interior of one supply duct or pipe 20, and the vertical distributor duct conduits 23A-23C are connected through duct connector sections 25 to the interior of the conduit or pipe 21. The connections can be made in a manner well known in sheet metal work, or plastic ducts of known configuration also may be used.

After the ducts have been installed as shown, the channels 14A, 14B and 14C, as well as other channels that might be constructed are filled with discrete particles such as rock 25 of suitable size. After filling, the channels 14A, 14B and 14C as shown extend to a level slightly above the top of the ducts 20 and 21. When the channels 14A-14C have been filled with rock suitable covers indicated at 27 can be placed over the tops of these channels to prevent additional fill or other foreign material from getting into the spaces between the rocks in the channels. The loose rock provides a porous filler for the channels 14A, 14B and 14C which filler has a high percentage of interstitial space through which air can readily pass. A layer of fill (sand or dirt) indicated at 28 can be placed over the covers 27, and above that a layer of insulation such as sawdust, hay, or other low cost insulation and indicated generally at 30 can be placed. The depth of this insulation can range from three to twenty four inches, depending on the locality and type of use of the heat storage channel. Above this layer, a layer of polyethelene sheeting (or other water impervious sheet) indicated generally at 31 can be placed to provide a ground water barrier, and sod or other material indicated at 32 can be placed on top of the polyethelene so that the upper surface of the ground resembles or is identical to the lawn or other ground surface adjacent the area where the channels 14A through 14C are dug.

Once the storage bed has been constructed as shown, the outer periphery can be insulated or protected from water intrusion if desired by digging separate trenches indicated generally at 33 and 34, which trenches would meet at the end of the heat storage area (surround the area) and as shown may terminate at the building wall 2. However the separate trenches could also be connected between the first rock storage channel 14A and the building if desired to completely surround the storage channels 14.

The trenches 33 and 34 can be filled with other insulation, and/or water impervious material indicated generally at 35, to surround the storage bed. This insulation skirt or enclosure is merely an optional configuration and in most instances it is not necessary unless the water table is high or other unusual problems exist.

As shown schematically, a fan indicated at 36 can be provided in one of the ducts 20 or 21. This fan is for either sending heated or cooled air into the storage media. Also, fans may be provided to pass air from the atmosphere to the storage material for heat or cold storage.

The vertical distributor ducts 22A-22C and 23A-23C are each provided with a plurality of apertures through the walls thereof. These apertures are indicated at 37, and provide for a discharge of air or other fluid from either one of the ducts 20 or 21 into the rock storage media, and also for exit of fluid from the other of the supply ducts.

The ducts 22A-22C and 23A-23C extend vertically along the ends of the channels 14A, 14B and 14C, respectively, so that fluid in these ducts will be discharged along the vertical dimension of the channels 14A-14C.

The ducts 20 and 21 as shown are near the top of the channels 14A-14C, but they could be in the vertical midportions, or near the bottom if desired. Further, the two ducts 20 and 21 do not have to be on the same level. That is, one may be adjacent the top of the channels 14A-14C and the other adjacent the bottom of the channels if desired.

The fan shown schematically at 36 is merely for illustrative purposes. It can be understood that the heat storage media comprising the rocks in the channels formed directly into the earth together with the adjacent earth can be used for storing solar heat; for storing heat from air conditioning units; or for storing excess heat from power plants in the summer, for example. The supply ducts can be connected in any desired manner for either heat storage or cold storage, and the removal of cool air or hot air from the storage bed.

It is important to note how heat is exchanged between the earth and the rock filled channel. When heat is being added rapidly, say for a few hours or less, only a few inches of the adjacent earth is significantly heated. On the other hand, when heat is added over a long period of time, either continuously or intermittently, a considerable thickness of adjacent earth may be heated. When the period of heat addition lasts for several days or several weeks or longer, all of the earth between the channels may be heated significantly and store a major portion of the heat, even when the thickness of earth between channels is as great as 4 to 10 feet or more. Relatively small channel spacing is appropriate when short heat storage duration is important, and relatively great spacing is appropriate when very long heat storage duration is involved. The same behavior exists when heat is being removed. Further, these considerations apply whether the problem is that of storing heat or storing cold. Thus, the methods of heat storage discussed here have particularly attractive features when relatively long term storage and removal are important, say at least a day or a few days, and especially when as long as several days, several weeks or even several months.

In spite of this, not a great deal of heat is lost downward or outward in the long term. This is partly because of the nature of soil and partly because of the nature of long term transient heat conduction. Soil is not a good heat conductor, nor is it a good insulator. It has a fairly good heat capacity. For such materials, well known transient heat conduction theory provides some important results. Over a period of a few hours heat does not move very far into a layer of earth. Over a period of a few days or weeks, or even months, heat may move a number of feet into soil but at distances of 10 or 20 feet or more, many months are needed before significant temperature changes are felt. For long term use, the type of heat storage described herein behaves as if it were losing heat rapidly downward and to the sides at first, and then more and more slowly as time goes on, so that after two or three years the heat loss rate is low. One can view this as a result of the surrounding earth having been slowly brought near the mean temperature of the storage system, which suppresses heat loss. Also, the distance over which heat must be conducted becomes very great.

Figure 3:
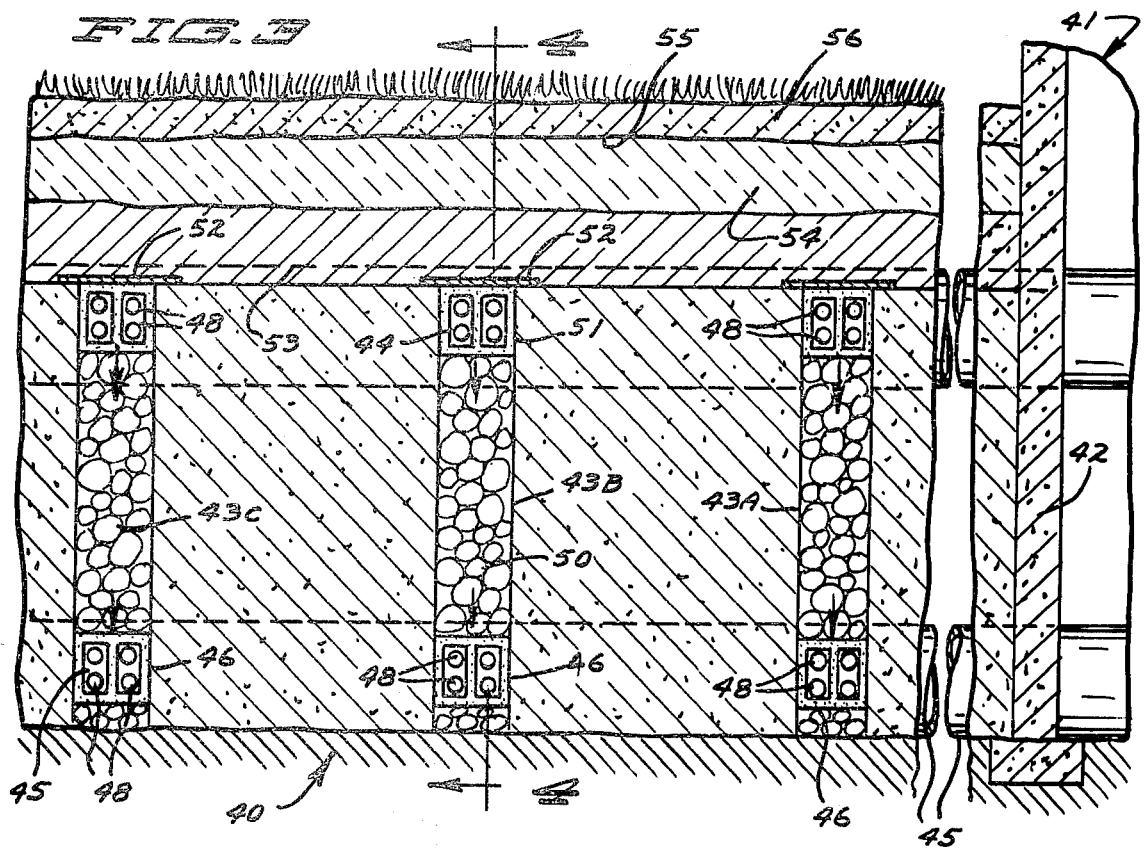
FIG. 3 is a vertical sectional view of a modified form of the invention taken as on line 3—3 in FIG. 4.
Figure 4:
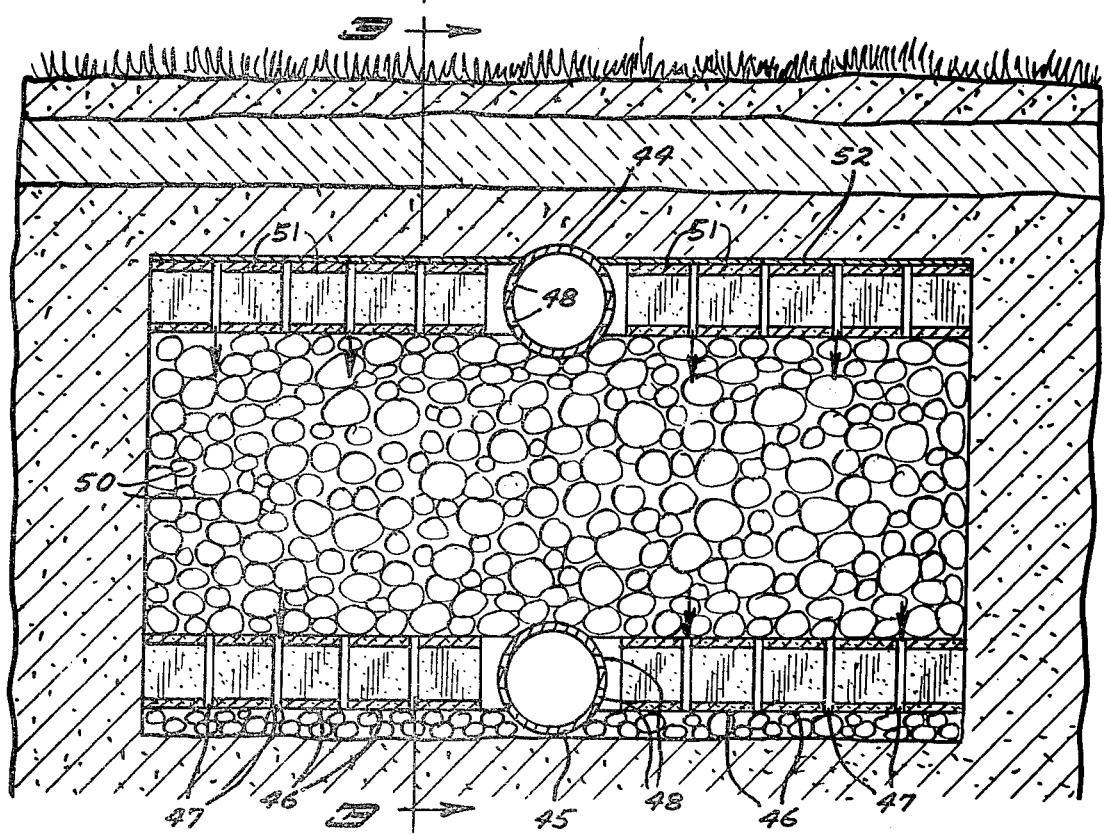
FIG. 4 is a sectional view taken as on line 4—4 in FIG. 3.

Referring now to FIGS. 3 and 4, a modified form of the invention is shown. In the modified form, the same general construction is used, but a different distribution system is utilized for circulating air to and from the storage material. As shown, a storage area or bed indicated generally at 40 is adjacent to a house or building 41, which has a wall 42. The storage area or bed is made up of a plurality of channels 43A, 43B and 43C dug directly into the earth, as in the previous form of the invention.

The channels 43A-43C are connected by an upper conduit or duct 44 and a lower conduit or duct 45 both of which extend transversely to the channels. These ducts may be installed by excavating another separate channel at right angles to the channels 43A-43C and placing the ducts 44 and 45 in the separate channel.

In constructing the storage system of this form of the invention, after the channel 43A-43C (and any other additional parallel channels desired) have been formed, and the cross channel or channels have been dug for installation of the supply and return ducts 44 and 45, the lower duct 45 is placed into position in the midportions of the channels 43 as shown (of course the duct 45 could be at either end of the channels 43 if desired) and a plurality of cinder or concrete blocks or tiles indicated at 46 are laid in the bottom of each of the channels 43A-43C. The blocks 46 are spaced apart as shown at 47 for air circulation between the blocks. As shown, the duct 45 has a plurality of openings 48 through the wall thereof on opposite sides thereof aligning with the channels 43A-43B so that the openings 48 open to the interior passageways of the respective blocks 46 on opposite sides of the duct 45. The interior passageways of the blocks 46 and the aligning openings 48 can be seen in FIG. 3.

The channels 43A-43C are then filled with rock of suitable size and the cross channel cut for installation of the duct 45 can be filled with earth between the channels 43. After the channels 43A-43C have been filled with the rock indicated generally at 50, the duct 44 is put in place and additional cinder or concrete blocks or tiles 51 are placed across the top of each channel 43, and are spaced apart. The duct 44 also has openings 48 in the wall thereof leading to the interior passageways of each of the blocks 51. Thus, the blocks 51 and 46 form transverse passageways at the top and bottom of each channel 43A-43C extending laterally outwardly from the ducts 44 and 45. Flow passageways to the rock from the lateral passageways are also formed by the spaces between the adjacent blocks 46 or 51.

The ducts 44 and 45 are connected to ducts on the interior of the house, and suitable fans or other devices for circulating air through the ducts 44 and 45 can be provided.

The channels and the blocks 51 are then covered with suitable covers 52, and a layer of fill 53 can be installed above these ducts if desired. Then a layer of insulation material 54 can be provided as well as a polyethelene sheet 55.

Sod or other material 56 then can be used for topping off the storage bed or area so that it appears the same as other adjacent areas of the ground.

The advantage of the arrangement shown in FIGS. 3 and 4 is that the heat or cold can be caused to remain stratified. In some storage units using rock or other media of large volume which permits air circulation through the media, a natural convection will be set up. Adjacent one end of the rock the warmer air will rise, and air will flow along the top of the storage area. A return flow passes down along the opposite side of the media and a return cross flow is formed at the bottom. This convection induced circulating flow tends to equalize temperatures so that the medium in the enclosure will tend to be maintained generally at a substantially equal temperature. Better heat exchange occurs with a larger temperature differential between the exchange airflow and the medium, so it is desirable to have stratified layers, with the hottest material at the top, and lower temperatures at the bottom. The form of the invention shown in FIGS. 3 and 4 permits this desirable result to be achieved.

Thus, in this form of the invention, the cold air connection, whether cold air is being taken out or provided to the storage material, is at the bottom and thus duct 45 is the cold air duct. The hot air duct, whether heat is being taken out or going into the storage medium channels is at the top and the hot air duct is thus duct 44.

Both of the ducts 44 and 45 can be at the ends of the channels 43, or alternately both large ducts 44 and 45 could be near the surface of the ground and separate ducts used to feed air to the blocks 46 of each channel 43 so that cold air that was added to or removed from the storage media would be still supplied at the bottom of the cross channels 43A-43C through the blocks 46.

Water barriers can be installed around the storage bed 40 if desired. If ground water is a serious problem, the entire bed location can be excavated to form a large hole and then the hole lined with polyethylene or suitable waterproof material and refilled in the form shown, with the cross channels 43A-43C holding the porous rock being separated by filled layers of earth.

In addition, in other situations where water intrusion is a serious problem, for example because of a high water table, or where digging is difficult, for example because bed rock is at or near the surface, part or all of the heat storage structure may be built above the original soil surface to form a small hill. In such cases only the lower part or none of the channels are formed by digging operation; much or all of the intervening earth between channels is added by filling operations. Such earth material fill is generally cheaper and more available in properly sized rock, so that there are still advantages over a simple rock bed in which substantially all heat is stored in such rock.

In FIGS. 3 and 4, the small hill or mound that is formed will be easily appreciated. The ground surface line is substantially along the bottom line of the channels shown, and the fill in between channels is added material forming the hill or mound above the ground surface. The connecting ducts at the break line of FIG. 3 for example are then connected into the channels in the hill in a suitable manner and can enter the building either below the ground surface as shown, or above the ground surface if desired.

A simple way to build the heat storage system above ground or partly above ground, when an adequate quantity of fill is economically available nearby, is to use this fill to make a mound. It is then packed or allowed to settle and channels are dug and filled with rock in the usual way.

Only one cross channel is necessary in the present devices, but as many channels as necessary may be used. The rock used may be crushed rock or "pea" rock of suitable size, such as that used for driveways or for drain fields. Rock ranging from ½ inch or so in major dimension (diameter) up to about six inches in major dimension, or even larger in some instances will work. The rocks have to be of size to provide spaces for free flow of air around and between them. Small sizes facilitate rapid addition or removal of heat but require more horsepower to force air through. Large sizes are more appropriate for cases of slow heat addition or removal.

This storage system has utility with respect to storing heat from solar heat collectors as previously stated. Another significant use is in connection with a heat pump (more or less an ordinary air conditioning system which is arranged for convenient reversal so that it may either heat or cool the interior of a building). In use with a heat pump, in the summer, a fan or blower can be used to rapidly circulate cold air through the storage medium whenever the outside air temperature is sufficiently cool so that heat may be removed from the storage medium. This would most likely happen at night though, perhaps, not every night, and therefore the ability to store sufficient heat (cold) for some days of service is highly desirable. the ability to store heat sufficient for weeks or even a few months appears practical with the present arrangement. Thus, when there is a high air conditioning demand, heat is rejected from the house or building into the storage medium rather than into the relatively warm outside air. This substantially reduces losses in the air conditioning equipment for two reasons: (1) Air conditioners are more efficient when the temperature difference against which they work is reduced; and (2) less work is needed to move heat from a building to a reservoir near the building temperature (the storage medium) rather than to an environment whose temperature is farther away (the outside ambient air). In winter, the reverse arrangement is used. The heat pump is reversed.

Where the bed is designed for only a few days heat or cold storage capacity, very little insulation or fill above the channels is necessary. For the cases where many days or many weeks heat storage is desired, relatively thick insulation and covering is advantageous. The present system can be installed anywhere on a residential lot or other property, where channels can reasonably be dug. It is relatively insensitive to elevation, exposure to the sun or shade, etc. Further, it can leave landscaping relatively undisturbed, since grass and small shrubbery can be installed directly above the storage system.

It is interesting and for some cases, important to observe that when cold is being stored, the channel structure is generally warmer than the incoming air. This causes a marked tendency for any water present in the channels (whether liquid or frozen) to be evaporated and carried away by the circulating air. The channels and surrounding earth tend to dry out thoroughly. This tends to reduce heat storage capacity somewhat, and reduces or eliminates possibility of frost or snow plugging the interstices between rocks.

Conversely, when heat is stored the channels are cooler and will condense moisture out of the air unless its dew point is below the rock temperature. This can result in water condensation in the bed, raising its storage capacity. Excess water would merely drain away. Should this mode of operation take place at temperatures below freezing, then trouble could result due to frost or ice freezing in the interstices.

What is claimed is:

1. The method of forming a heat or cold storage arrangement comprising the steps of forming at least one channel between earth material layers, said channel being substantially upright and having an upright dimension substantially greater than its horizontal width and having a preselected length, placing perforated fluid carrying ducts which substantially span the horizontal width of the channel at spaced locations in said channel, filling said channel between said ducts with a material comprising discrete solid particles having substantial interstitial spaces, and connecting said ducts to means to circulate fluid from one duct to the other through the interstitial spaces.

2. The method of claim 1 wherein the steps of forming a channel comprises digging the channel directly in the earth below the surface of the ground.

3. The method of claim 2 including the method of digging a separate trench spaced from and surrounding desired portions of said first mentioned channel, and filling said trench with an insulation material.

4. The method of claim 1 including the step of overlaying said channel with a layer of insulating material, and covering said insulating material with a water impervious layer.

5. The method of claim 1 wherein the step of forming said channel comprising the digging of said channel with excavation equipment used.

* * * * *